(12) United States Patent
Miyagi

(10) Patent No.: US 9,578,243 B2
(45) Date of Patent: Feb. 21, 2017

(54) PHOTOGRAPHING APPARATUS AND PHOTOGRAPHING CONTROL METHOD

(71) Applicant: RICOH IMAGING COMPANY, LTD., Tokyo (JP)

(72) Inventor: Keishi Miyagi, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/032,141

(22) PCT Filed: Sep. 30, 2014

(86) PCT No.: PCT/JP2014/076078
§ 371 (c)(1),
(2) Date: Apr. 26, 2016

(87) PCT Pub. No.: WO2015/064278
PCT Pub. Date: May 7, 2015

(65) Prior Publication Data
US 2016/0261800 A1    Sep. 8, 2016

(30) Foreign Application Priority Data

Oct. 30, 2013  (JP) .................................. 2013-224841

(51) Int. Cl.
*H04N 5/232*  (2006.01)
*G03B 13/00*  (2006.01)
(Continued)

(52) U.S. Cl.
CPC ........ *H04N 5/23287* (2013.01); *G02B 27/646* (2013.01); *G03B 5/00* (2013.01);
(Continued)

(58) Field of Classification Search
CPC ............. H04N 5/2254; H01L 27/14625; G03B 2205/0053; G03B 2205/0061; G03B 2205/0069; G03B 2205/0084; G03B 11/00; G02B 7/16
(Continued)

(56) References Cited

U.S. PATENT DOCUMENTS 6,587,148 B1  7/2003  Takeda et al.
8,681,231 B2  3/2014  Asakura et al.
(Continued)

FOREIGN PATENT DOCUMENTS

JP  H09-116910 A  5/1997
JP  2008-035241 A  2/2008

OTHER PUBLICATIONS

U.S. Appl. No. 15/031,875 to Norio Numako, filed Apr. 25, 2016.
(Continued)

*Primary Examiner* — Kelly L Jerabek
(74) *Attorney, Agent, or Firm* — Greenblum & Bernstein, P.L.C.

(57) ABSTRACT

A photographing apparatus includes a movable-member driver configured to move a movable member in a direction that is different from an optical axis of a photographing optical system, wherein the movable member includes at least one of an optical element, constituting at least one part of the photographing optical system, and an image sensor; a movable-member drive controller configured to drive the movable member to move in a circular path of a predetermined diameter via the movable-member driver; and a processor configured to select a drive diameter D of the circular path by which the drive controller drives the movable member within a range of the following condition (1):

$$d^*\pi/(2^*2^{1/2}) \leq D \leq d^*\pi/2 \qquad (1),$$

wherein d designates a pixel interval of the image sensor.

6 Claims, 8 Drawing Sheets

(51) Int. Cl.
  *G03B 5/00* (2006.01)
  *G02B 27/64* (2006.01)
  *H04N 9/04* (2006.01)
  *H04N 9/083* (2006.01)
  *H04N 5/225* (2006.01)

(52) U.S. Cl.
  CPC ......... *H04N 5/23258* (2013.01); *H04N 9/045* (2013.01); *H04N 9/083* (2013.01); *G03B 2205/0015* (2013.01)

(58) Field of Classification Search
  USPC ....... 348/208.99, 208.11, 340, 342, 357, 360
  See application file for complete search history.

(56) References Cited

U.S. PATENT DOCUMENTS

| | | | |
|---|---|---|---|
| 9,451,168 B2* | 9/2016 | Yamamoto | H04N 5/353 |
| 2003/0011747 A1* | 1/2003 | Lenz | H04N 3/1587 |
| | | | 352/166 |
| 2008/0174678 A1* | 7/2008 | Solomon | G02B 27/0025 |
| | | | 348/231.99 |
| 2008/0297647 A1* | 12/2008 | Okabe | G03B 17/14 |
| | | | 348/340 |
| 2010/0079825 A1* | 4/2010 | Yamazaki | G02B 27/46 |
| | | | 358/474 |
| 2015/0381894 A1* | 12/2015 | Terauchi | H04N 5/23248 |
| | | | 348/208.7 |
| 2016/0006937 A1 | 1/2016 | Yamamoto | |
| 2016/0026068 A1* | 1/2016 | Yamamoto | H04N 5/2253 |
| | | | 348/342 |
| 2016/0094767 A1 | 3/2016 | Yamamoto | |

OTHER PUBLICATIONS

U.S. Appl. No. 15/031,906 to Norio Numako, filed Apr. 25, 2016.
U.S. Appl. No. 15/105,971 to Koichi Muramatsu et al., filed Jun. 17, 2016.
Search Report issued by WIPO in PCT/JP2014/076078, dated Dec. 22, 2014.

\* cited by examiner

PHOTOGRAPHING APPARATUS AND PHOTOGRAPHING CONTROL METHOD

TECHNICAL FIELD

The present invention relates to a photographing apparatus and a photographing control method which are capable of obtaining an optical low-pass filter effect by driving a movable member (shake-correction member) in an direction different (e.g., within a plane that is orthogonal to the optical axis) to that of an optical axis of a photographing optical system.

BACKGROUND ART

Image sensors of photographing apparatuses such as digital still cameras and digital video cameras, or the like, sometimes create moiré and false color, etc., that do not originally exist in an object if light rays emanating from the object contain components of spatial frequency that exceeds the limit spatial frequency of the image sensor. To reduce the occurrence of such phenomena, an optical low-pass filter is conventionally used; however, if an optical low-pass filter is used, the resolving power, a sense of resolution and contrast deteriorate. Furthermore, increases in cost and size of the image sensor also occur.

Patent Literature 1 discloses a photographing apparatus that achieves an optical low-pass filter effect to eliminate moiré and false color, etc., without the use of an optical low-pass filter by receiving object-emanating light rays via a plurality of pixels of different colors while driving an image sensor in a circular path in a direction orthogonal to the optical axis of the photographing optical system.

However, in the case where an image sensor is driven in a circular path in a direction orthogonal to the optical axis of the photographing optical system, the removal effect of false color and a deterioration in a sense of resolution can greatly differ depending on the driving diameter. For example, in the case where the driving diameter is too large, the sense of resolution is significantly deteriorated due to the image blurring by a large amount, and in the case where the driving diameter is too small, almost no false color removal effect is obtained. Accordingly, a driving diameter is desired which can obtain a maximum false color removal effect with the sense of resolution not deteriorating more than a noticeable amount.

CITATION LIST

Patent Literature

Patent Literature 1: Japanese Unexamined Patent Publication No. 2008-35241

SUMMARY OF THE INVENTION

Technical Problem

The present invention has been completed based on the above described problems, and an object of the present invention is to achieve a maximum false-color removal effect without the sense of resolution deteriorating more than a noticeable amount by driving the image sensor in "an appropriate driving diameter" when driven in a circular path within a plane that is orthogonal to the optical axis of the photographing optical system.

Solution to Problem

The inventor of the present invention has completed the present invention based on the finding that there is a uniform relationship between the repetitive pattern generated by false color and the pixel interval (pixel width) of the image sensor.

The photographing apparatus of the present invention is provided, including an image sensor, which converts an object image that is formed by a photographing optical system into electrical pixel signals, and includes a plurality of color filters; a movable-member driver configured to move a movable member in a direction that is different from an optical axis of the photographing optical system, wherein the movable member includes at least one of an optical element, constituting at least one part of the photographing optical system, and the image sensor; a drive controller configured to control a driving of the movable member to move in a predetermined circular path via the movable-member driver; and a processor configured to select a drive diameter D of the predetermined circular path by which the drive controller controls the driving of the movable member within a range of the following condition (1):

$$d*\pi/(2*2^{1/2}) \le D \le d*\pi/2 \tag{1},$$

wherein d designates a pixel interval of the image sensor.

The processor can select a value of "$d*\pi/(2*2^{1/2})$" or "$d*\pi/2$" as the drive diameter D.

It is practical for the movable member to include the image sensor, wherein the movable-member driver is provided with a mount support plate; a movable stage onto which the image sensor is mounted, the movable stage being slidable relative to the mount support plate; a magnet mounted on one of the mount support plate and the movable stage; and a drive coil mounted on the other of the mount support plate and the movable stage, and wherein the drive controller is configured to control a driving of the movable stage to move in the predetermined circular path relative to the mount support plate by supplying an alternating drive signal to the drive coil.

A photographing control method is provided, which includes an image sensor, which converts an object image that is formed by a photographing optical system into electrical pixel signals, and includes a plurality of color filters; and a movable-member driver configured to move a movable member in a direction that is different from an optical axis of the photographing optical system, wherein the movable member includes at least one of an optical element, constituting at least one part of the photographing optical system, and the image sensor; the photographing control method including controlling a driving of the movable member to move in a circular path of a predetermined drive diameter via the movable-member driver; and selecting a drive diameter D of the circular path by which the driving of the movable member is controlled within a range of the following condition (1):

$$d*\pi/(2*2^{1/2}) \le D \le d*\pi/2 \tag{1},$$

wherein d designates a pixel interval of the image sensor.

Advantageous Effects of the Invention

According to the present invention, false color in horizontal and vertical directions and false color in diagonal directions, which occur due to the relationship between the pixel interval d of the image sensor and the wavelength of a ring formation, can be easily reduced while suppressing deterioration the sense of resolution.

EMBODIMENT

An embodiment of a digital camera (photographing apparatus) 10 according to the present invention will be hereinafter discussed with reference to FIGS. 1 through 10B.

Figure 1:
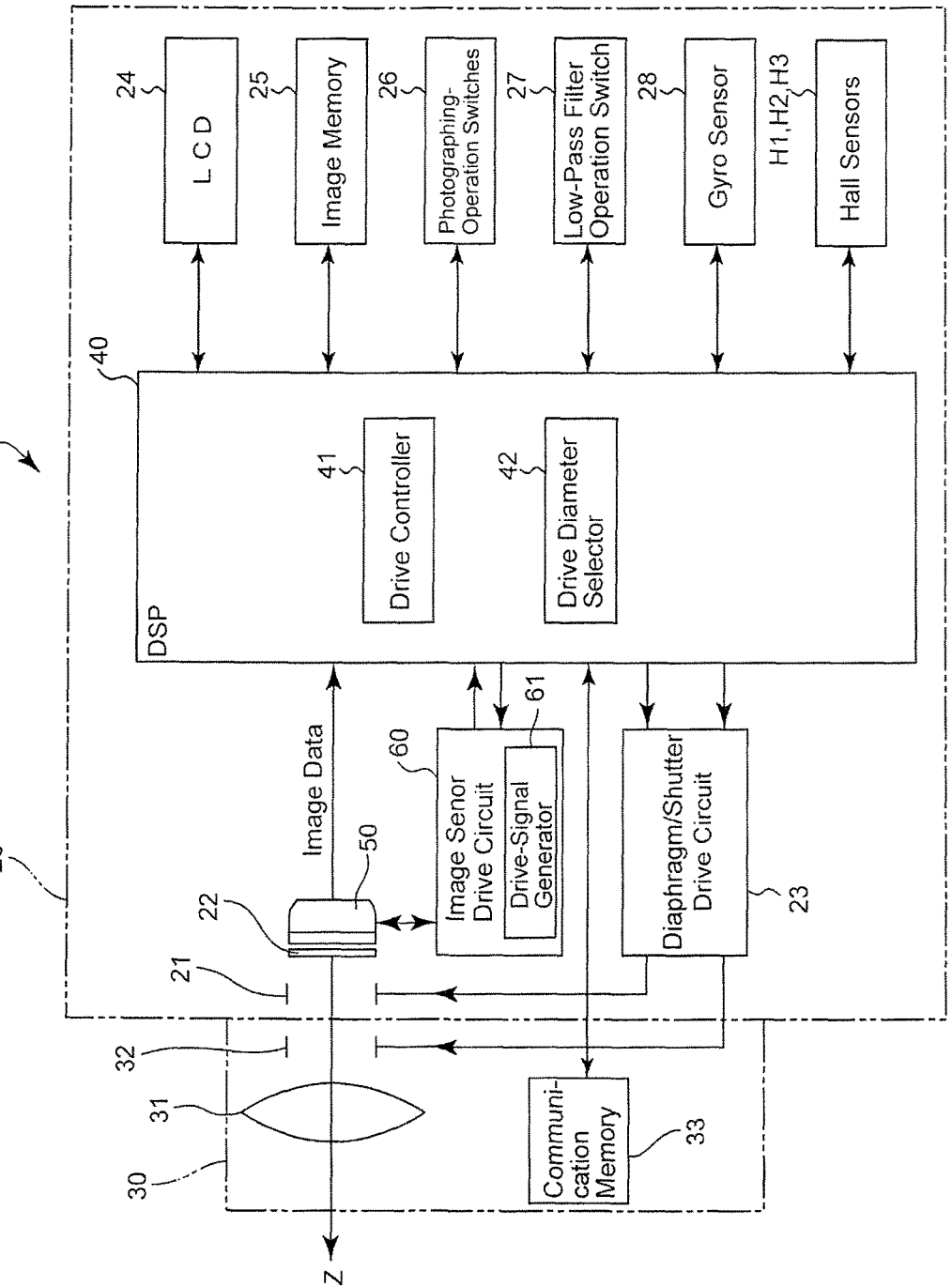
FIG. 1 is a block diagram showing main components of a digital camera according to the present invention.

As shown in FIG. 1, the digital camera 10 is provided with a body 20, and a photographing lens 30 (an interchangeable photographing lens) which is detachably attached to the body 20. The photographing lens 30 is provided with a photographing lens group (photographing optical system/movable member/image-shake correction member) 31, and a diaphragm (photographing optical system) 32, in that order from the object side (left side of FIG. 1) to the image side (right side of FIG. 1). The body 20 is provided with a shutter (photographing optical system) 21, and an image sensor (movable member/image-shake correction member) 22, in that order from the object side (left side of FIG. 1) to the image side (right side of FIG. 1). Furthermore, the body 20 is provided with a diaphragm/shutter drive circuit 23 which controls the driving of the diaphragm 32 and the shutter 21 when the photographing lens 30 is attached to the body 20. An object image, which is formed by object-emanating light rays that are incident on the photographing lens group 31 and pass through the diaphragm 32 and the shutter 21, is formed on a light-receiving surface of the image sensor 22. The object image which is formed on the light-receiving surface of the image sensor 22 is electrically converted into pixel signals via a large number of pixels, arranged in a matrix, and is output as image data to a DSP 40. The DSP 40 performs predetermined image processing on the image data that has been input therein from the image sensor 22; and this processed image data is displayed on an LCD 24 and is stored in an image memory 25. Furthermore, although the photographing lens group 31 is indicated in FIG. 1 as a single lens element (optical element), in practice the photographing lens group 31 includes a plurality of lens elements (optical element) such as, e.g., a fixed lens element(s), lens elements of a zoom lens system which move during zooming, and/or a focusing lens element (s) which moves during focusing, etc.

Although not shown in the drawings, the image sensor 22 is configured of a plurality of components, such as a package, a solid-state imaging device chip accommodated in the package, and a lid member fixed onto the package in order to protect the solid-state imaging device chip in an air-tight manner. In the present specification, "driving the image sensor (movable member/image-shake correction member) 22" refers to "driving at least a part of the plurality of components of the image sensor (movable member/image-shake correction member) 22 through which the object-emanating light rays pass or which receive an object light-bundle".

The photographing lens 30 is provided with a communication memory 33 which stores various information, such as resolution (MTF) information of the photographing lens group 31 and aperture diameter information (aperture value) of the diaphragm 32, etc. In a state where the photographing lens 30 is attached to the body 20, various information stored in the communication memory 33 is read into the DSP 40.

The body 20 is provided with photographing-operation switches 26 and low-pass filter switches 27 which are connected to the DSP 40. The photographing-operation switches 26 include various switches, such as a power switch and a shutter-release switch, etc. The low-pass filter switches 27 are for switching ON and OFF a low-pass filter operation which is driven within a plane (also referred to as "within an optical-axis orthogonal plane") that is orthogonal to the optical axis Z of the photographing optical system of the image sensor 22, and are for various settings in regard to the low-pass filter operation. Details of the low-pass filter operation of the image sensor 22 will discussed hereinbelow.

The body 20 is provided with a gyro sensor (shake detector) 28 which is connected to the DSP 40. The gyro sensor 28 detects shake detection signals that indicate shaking in a plane that is orthogonal to the optical axis within the body 20 by detecting the angular velocity of movement that is applied to the body 20 (about an x-axis and a y-axis).

Figure 2:
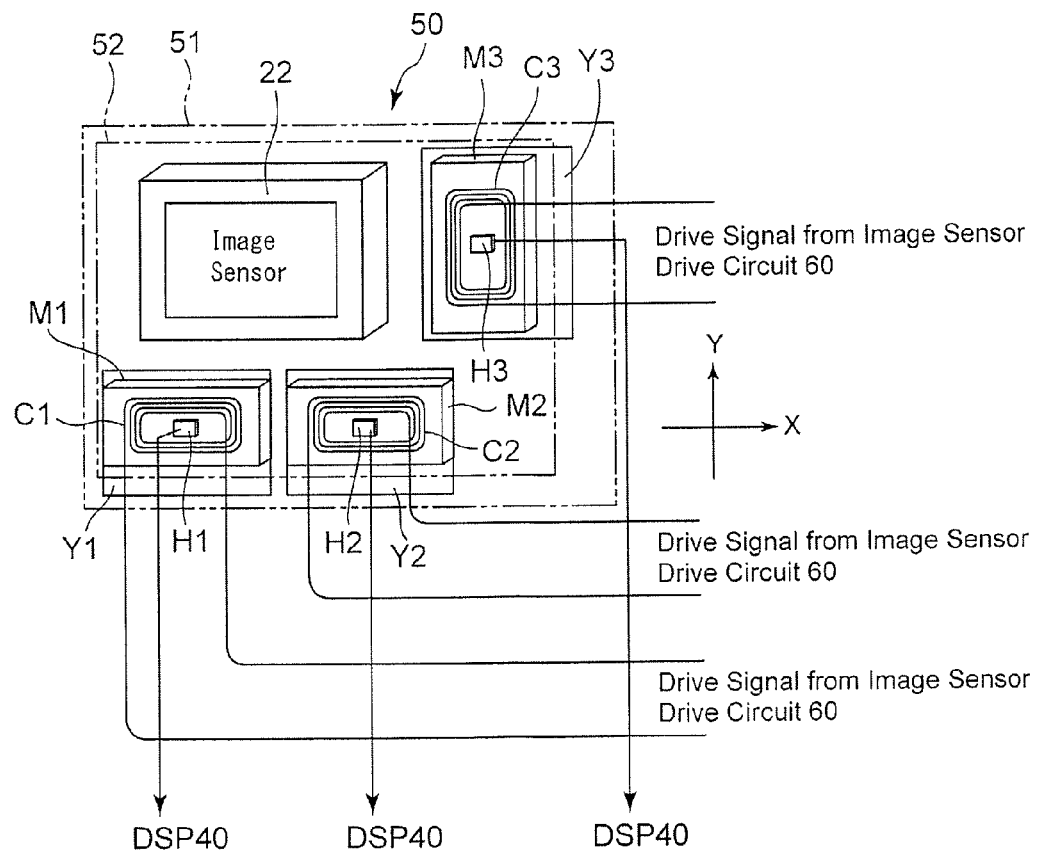
FIG. 2 is a block diagram showing main components of an image shake correcting device of the digital camera according to the present invention.
Figure 3:
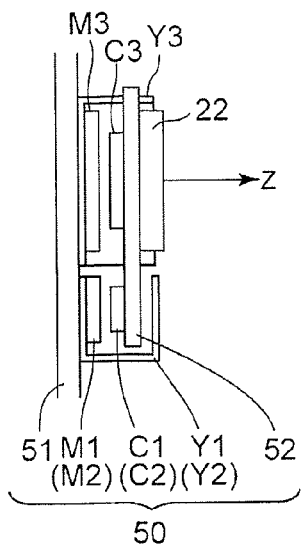
FIG. 3 is a side elevational view showing an arrangement of the image-shake correction device of the digital camera according to the present invention.

As shown in FIGS. 1 through 3, the image sensor 22 is mounted onto an image-shake correction device (movable-member driver) 50 so that the image sensor 22 is movable in an x-direction and a y-direction (two orthogonal directions), which are orthogonal to an optical axis Z of the photographing optical system. The image-shake correction device 50 is provided with a mount support plate 51 which is mounted onto a structural member such as a chassis, etc., of the body 20; a movable stage 52, onto which the image sensor 22 is mounted, which is slidable relative to the mount support plate 51; magnets M1, M2 and M3 mounted onto the mount support plate 51 on the side thereof that faces the movable stage 52; yokes Y1, Y2 and Y3 which are made of a magnetic material and are mounted onto the mount support plate 51 to face the magnets M1, M2 and M3 with the movable stage 52 positioned between the magnets M1, M2 and M3 and the yokes Y1, Y2 and Y3, thereby forming a magnetic circuit between the yokes Y1, Y2 and Y3 and the magnets M1, M2 and M3, respectively; and drive coils C1, C2 and C3, mounted onto the movable stage 52, which each generate a driving force by receiving an electric current within the magnetic field of the magnetic circuit. The movable stage 52 (image sensor 22) is driven relative to the mount support plate 51 within a plane that is orthogonal to the optical axis by supplying (applying) alternating drive signals (alternating current) to the drive coils C1, C2 and C3. The alternating drive signals that are supplied to the drive coils C1, C2 and C3 are controlled by a drive-signal processor 41 of the DSP 40 and are generated by a drive-signal generator 61 of an image sensor drive circuit 60.

In the illustrated embodiment, a magnetic driver configured of the magnet M1, the yoke Y1 and the drive coil C1, and a magnetic driver configured of the magnet M2, the yoke Y2 and the drive coil C2 (two magnetic drivers) are arranged along a long-side direction (horizontal direction/x-direction) of the image sensor 22 at a predetermined distance therebetween; and a magnetic driver configured of the magnet M3, the yoke Y3 and the drive coil C3 (one magnetic driver) is arranged along a short-side direction of the image sensor 22 orthogonal to the long-side direction thereof (vertical direction/y-direction).

The mount support plate 51 is further provided with Hall sensors (position detectors) H1, H2 and H3 arranged in the close vicinity of the drive coils C1, C2 and C3, respectively (within the central spaces thereof). The Hall sensors H1, H2 and H3 detect the magnetic force of the magnets M1, M2 and M3 and detect position detection signals, which indicate the position of the movable stage 52 (image sensor 22) in the optical-axis orthogonal plane. The y-directional position and inclination (rotation) of the movable stage 52 (image sensor 22) are detected by the Hall sensors H1 and H2, and the x-directional position of the movable stage 52 (image sensor 22) is detected by the Hall sensor H3. The DSP 40 controls, via the image sensor drive circuit 60 (which will be described hereinbelow), the driving of the image-shake correction device 50, which moves the image sensor 22 within a plane orthogonal to the optical axis, based on shake detection signals detected by the gyro sensor 28 that indicate shake/vibrations applied to the body 20 in a plane orthogonal to the optical axis, and position-detection signals that indicate the position of the image sensor 22 within a plane orthogonal to the optical axis detected by the Hall sensors H1, H2 and H3. Accordingly, the imaging position of the object image on the image sensor 22 can be displaced to correct image shake that is caused by hand shake/vibrations. In the illustrated embodiment, this operation is referred to as an "image-shake correction operation (image-shake correction drive) of the image-sensor 22".

In the image-shake correction device 50 of the illustrated embodiment, the image sensor 22 is driven along a predetermined path within a plane that is orthogonal to the optical axis Z of the photographing optical system, to provide an optical low-pass filter effect (hereinafter referred to as a "LPF effect") by making an object light-bundle incident on a plurality of pixels, having different detection colors (color filters having a plurality of different colors), of the image sensor 22. Hence, an LPF effect is obtained by moving the image sensor 22, on which the object-image on the image sensor 22 moves along a predetermine path on the light-receiving surface of the image sensor 22. In the illustrated embodiment, this operation is referred to as the "low-pass filter operation (LPF operation/LPF drive) of the image sensor 22". The drive-signal processor 41 and the image sensor drive circuit 60 (drive signal generator 61) constitute a drive controller, which controls the driving of the image sensor 22 via the image-shake correction device 50 so that the object image moves in a predetermined path (approximate circular path) on the image sensor 22.

The image-shake correction device 50 of the illustrated embodiment carries out a "central-holding operation (central-holding drive) of the image sensor 22" which holds the image sensor 22 at the central position of the image-shake correction movement-range (image-shake correction driving-range). For example, when the "image-shake correction operation (image-shake correction drive) of the image-sensor 22" and the "LPF operation (LPF drive) of the image sensor 22" are both OFF, a photographing operation is performed with only the "central-holding operation (central-holding drive) of the image sensor 22" turned ON (even if image-shake correction is not carried out).

An embodiment is possible in which the "image-shake correction operation (image-shake correction drive) of the image-sensor 22", the "LPF operation (LPF drive) of the image sensor 22" and the "central-holding operation (central-holding drive) of the image sensor 22" are achieved as a combined operation (combined driving) thereof by the image-shake correction device 50, or in which only one of these operations are achieved by the image-shake correction device 50.

Figure 4:
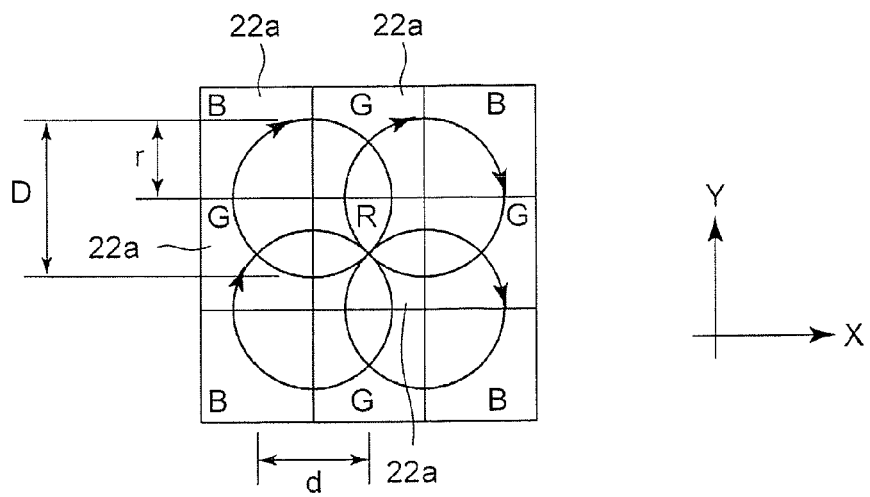
FIG. 4 is a diagram that indicates an optical low-pass filter effect that is provided by driving an image sensor to trace a rotationally symmetrical circular path about an optical axis of a photographing optical system.

The LPF operation, which provides an LPF effect (false color removal) using the image sensor 22 via the image-shake correction device 50 driving the image sensor 22 in a predetermined path, will be hereinafter explained with reference to FIG. 4. In FIG. 4, the image sensor 22 is provided with a large number of pixels 22a arranged in a matrix form at a predetermined pixel interval d on the light-receiving surface, and one color filter of color filters R, G and B, which are arranged in a Bayer array, is provided on a front surface of each pixel 22a. The pixels 22a and the color filters R, G and B are square in shape, and are configured in units of four color filters R, G, B and G. Each pixel 22a detects the color of the object light-rays that pass through one of the color filters R, G, B and G, on the front surface of the associated pixel 22a, and are incident thereon; namely, the color component (color zone) of the light is photoelectrically converted and a charge corresponding to the strength (brightness) thereof is accumulated. The charges accumulated by the pixels 22a are converted into image signals, and is output to the DSP 40 as image data.

FIG. 4 indicates the case where the image sensor 22 is driven in rotationally symmetrical circular paths about the optical axis Z of the photographing optical system. These circular paths are closed circular paths having a radius r that is a predetermined ratio of the pixel interval d of the image sensor 22. The circular paths do not need to trace a perfect circle, these paths can be deformed, swing or fluctuate.

As shown in FIG. 4, when the image sensor 22 is driven, during an exposure, along a circular path of a predetermined diameter (predetermined circular path), since the object light rays (light bundle) that are incident on the center of each color filter R, G, B and G (pixels 22a) are incident on the four color filters R, G, B and G, a similar effect to that of an optical low-pass filter can be obtained. In other words, since the light rays that are incident on any of the color filters R, G, B and G (pixels 22a) are also incident on surrounding color filters R, G, B and G (pixels 22a), an effect (LPF/false-color removal effect) that is the same as if the light rays are passing through an optical low-pass filter can be obtained.

However, if the radius r is too large relative to the pixel interval d, a low-pass filter effect cannot be attained and the sense of resolution deteriorates; whereas if the radius r is too small, the low-pass filter effect becomes weak. A certain radius is able to prevent false color (moire) that often occurs in the vertical and horizontal directions, but cannot prevent false color (moire) from occurring in a 45 degree direction; or another radius is able to prevent false color (moire) that often occurs in a 45 degree direction, but cannot prevent false color (moire) from occurring in the vertical and horizontal directions.

Figure 5:
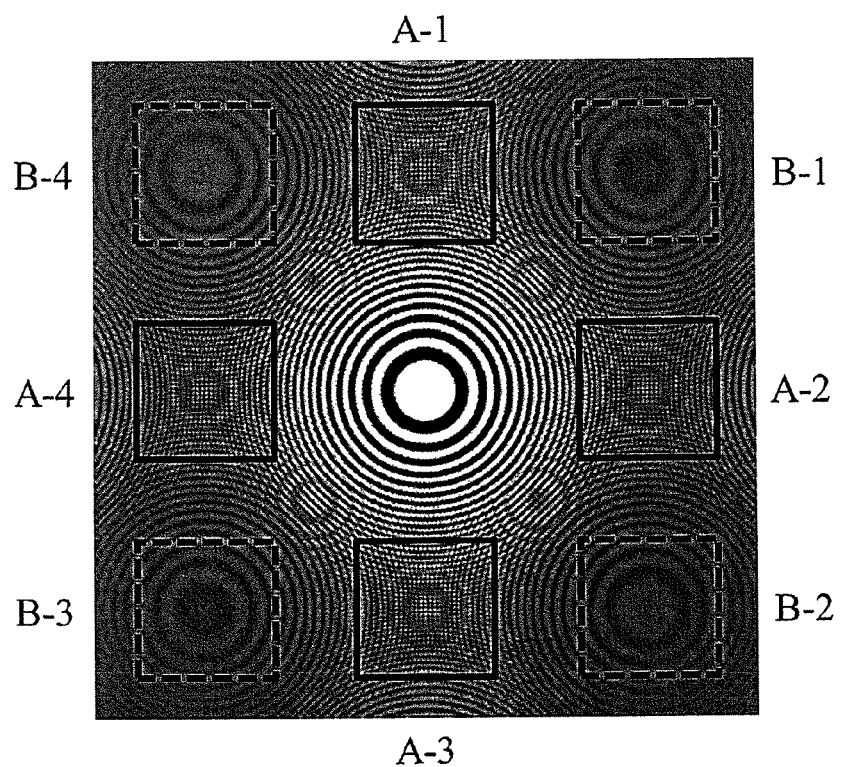
FIG. 5 is an explanatory diagram of false color (moire) that is generated upon a CZP chart being photographed by the digital camera.

A situation where false color (moire) has occurred will be described hereinbelow with reference to FIG. 5. As shown in FIG. 5, upon the digital camera 10 taking (in a normal photographing mode) a photograph of a CZP chart, in which concentric ring formation is portrayed with the wavelength (interval) of the ring formation becoming shorter the further outward they occur, an image in which false color (moire) has occurred can be obtained. In particular, a large amount of false color has occurred in areas A-1 through A-4, which are enclosed by square solid lines, and in areas B-1 through B-4, which are enclosed by square broken lines.

The central portions of each of the areas A-1 through A-4 has "a wavelength that is double the pixel interval d", in which areas A-1 and A-3 are horizontal ring formations and areas A-2 and A-4 are vertical ring formations.

The central portions of each of the areas B-1 through B-4 has "a wavelength that is $2^{1/2}$ times the pixel interval d", in which areas B-1 and B-3 are downward and rightward 45-degree diagonal ring formations, and areas B-2 and B-4 are upward and rightward 45-degree diagonal ring formations.

Figure 6:
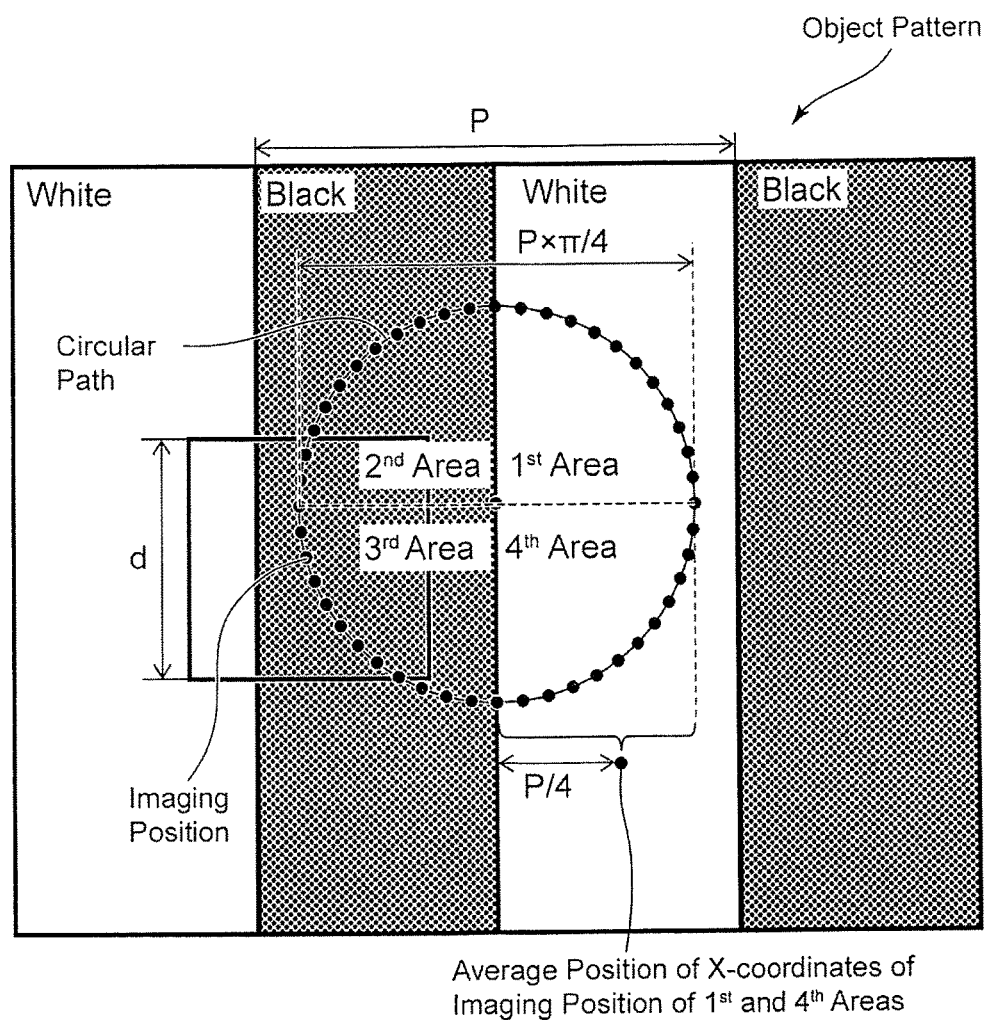
FIG. 6 is an explanatory diagram of a relationship between the diameter of the circular path of the image sensor and the wavelength of a repetitive pattern which can remove false color using the image sensor, which has a predetermined pixel interval.

The principle for obtaining the aforementioned radius of the circular path of the image sensor 22 that can remove false color is as follows:

Upon driving the image sensor 22 in circles at a constant velocity in a plane that is orthogonal to the optical axis O of the photographing optical system, light is accumulated with each imaging position at the center of a square pixel arranged at equal positions on the circular path, as shown in FIG. 6. Although the actual imaging positions are continuous and infinite in number, a finite number of imaging positions are indicated to simplify the explanation.

Note that in the case of vertical ring formation having a wavelength P, when the average X-coordinate position out of the imaging positions within the half-circular area (the $1^{st}$ and $4^{th}$ areas in FIG. 6) is ¼ of the wavelength P of the ring formation away from the driving center on the X-coordinate, as shown in FIG. 6, the light bundle of the ring formation is accumulated at the pixel while being averaged out as much as possible, so as to be as evenly diffused (dispersed) as possible.

With the driving center as the origin, a driving diameter D is obtained by the following equation, wherein the average X-coordinate position out of the imaging positions within the half-circular area (the $1^{st}$ and $4^{th}$ areas in FIG. 6) is P/4:

$$\frac{\int_{-\frac{\pi}{2}}^{\frac{\pi}{2}} \frac{D}{2}\cos\theta\, d\theta}{\pi} = \frac{\frac{D}{2} \times [\sin\theta]_{-\frac{\pi}{2}}^{\frac{\pi}{2}}}{\pi} = \frac{\frac{D}{2} \times \{\sin\frac{\pi}{2} - \sin(-\frac{\pi}{2})\}}{\pi} = \frac{\frac{D}{2} \times \{1+1\}}{\pi} = \frac{D}{\pi}$$ [EQUATION 1]

$$\frac{D}{\pi} = \frac{P}{4}$$

Driving Diameter: D=P*π/4

The above equation is the same regardless of the ring formation direction or the black-and-white proportion of the ring formation. Accordingly, in the case where the image sensor 22 forms an image while being driven in a circle at a constant velocity at the driving diameter D in a plane orthogonal to the optical axis Z of the photographing lens group 31 (photographing optical system), the ring formations that diffuse the most evenly (whether the light bundle is incident on four pixels in an evenly dispersed manner) can be generally portrayed by the following expression:

"In the case of driving diameter D, the object-image pattern at a wavelength of D/(π/4) diffuses the most evenly".

With the above expression, in the photographed image of FIG. 5 for example, when mainly the false color occurring in the vertical ring formation or the horizontal ring formation having a "wavelength that is double the pixel interval d" of areas A-1 through A-4 is desired to be removed, if the image sensor 22 is driven in circles at a constant velocity at a driving diameter D=d*π/2, a maximum false-color removal effect can be obtained.

Whereas, when mainly the false color occurring in a 45-degree diagonal ring formation having a "wavelength that is $2^{1/2}$ times the pixel interval d" of areas B-1 through B-4 is desired to be removed, if the image sensor 22 is driven in circles at a constant velocity at a driving diameter D=d*π/(2*$2^{1/2}$), a maximum false-color removal effect can be obtained.

Figure 7:
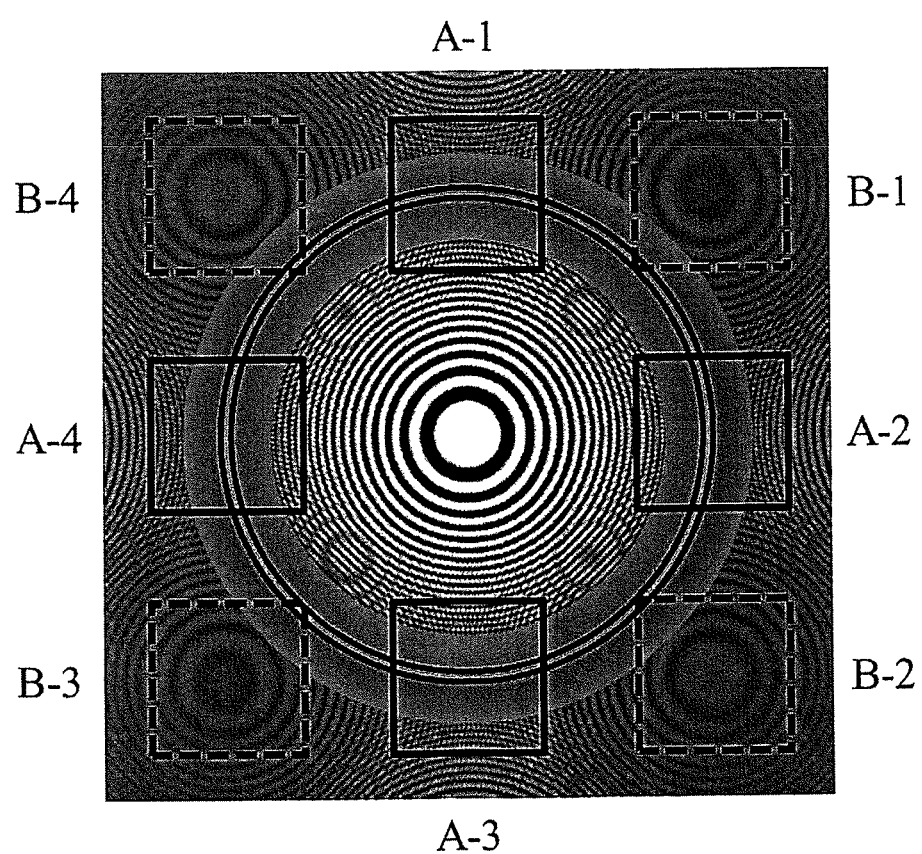
FIG. 7 is an explanatory diagram of an image of a CZP chart that was photographed by the digital camera, of the illustrated embodiment, while driving the image sensor in a circular path, having a diameter of $\pi/2$ times the pixel interval d.

FIG. 7 shows a photographed image in which a CZP chart imaged by driving the image sensor 22 at a driving diameter of D=d*π/2. In this imaged image, the portion (circular double-ringed portion) of the "d*(π/2)/(π/4)= 2d*wavelength of object-image pattern" is well diffused. The "2d wavelength of object-image pattern" lies exactly on the areas A1 through A4, at which a large amount of false color occurs, so that false color is not noticeable in the diffused area that occurs in a strip area centered along the circular double-ringed portion, and a prominent false-color removal effect can be obtained in the areas A1 through A4.

Figure 8:
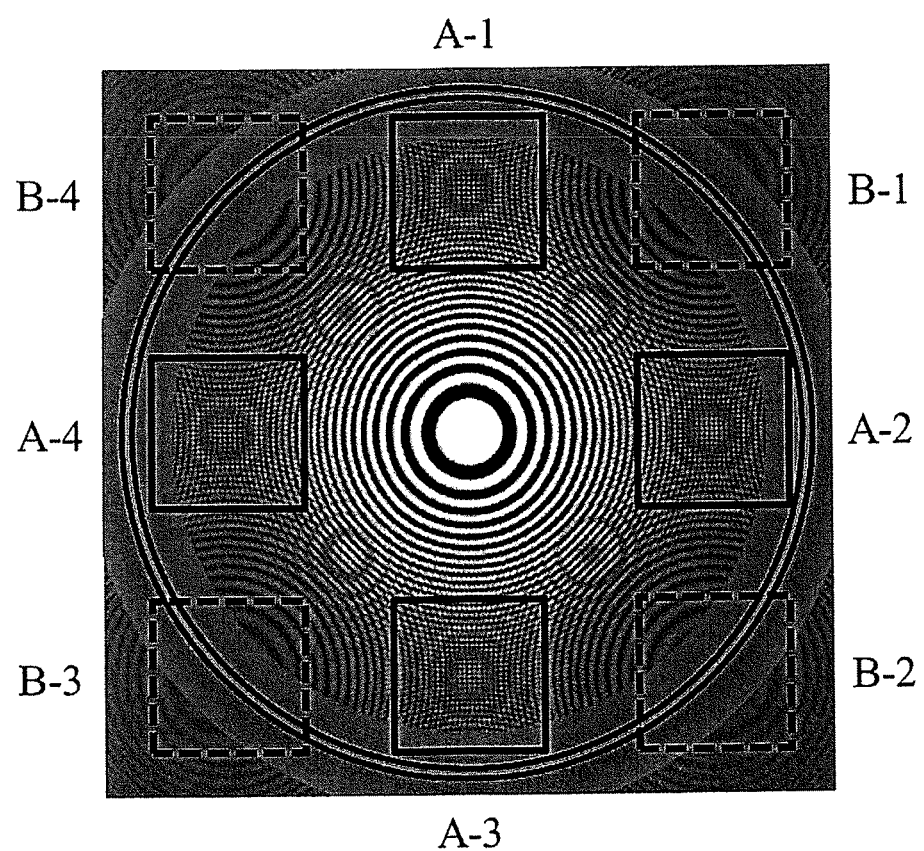
FIG. 8 is an explanatory diagram of an image of a CZP chart that was photographed by the digital camera, of the illustrated embodiment, while driving the image sensor in a circular path, having a diameter of $\pi/(2*2^{1/2})$ times the pixel interval d.

Whereas, FIG. 8 shows a photographed image in which a CZP chart is imaged by driving the image sensor 22 at a driving diameter of D=d*π/(2*$2^{1/2}$). In this imaged image, the portion (circular double-ringed portion) of the "d*(π/(2*$2^{1/2}$))/(π/4)=$2^{1/2}$d wavelength of object-image pattern" is well diffused. The "$2^{1/2}$d wavelength of object-image pattern" lies exactly on the areas B1 through B4, at which a large amount of false color occurs, so that false color is not noticeable in the diffused area that occurs in a strip area centered along the circular double-ringed portion, and a prominent false-color removal effect can be obtained in the areas B1 through B4.

Since "drive diameter D=d*π/(2*$2^{1/2}$)" is smaller than "drive diameter D=d*π/2", deterioration in the sense of resolution can be suppressed.

Figure 9:
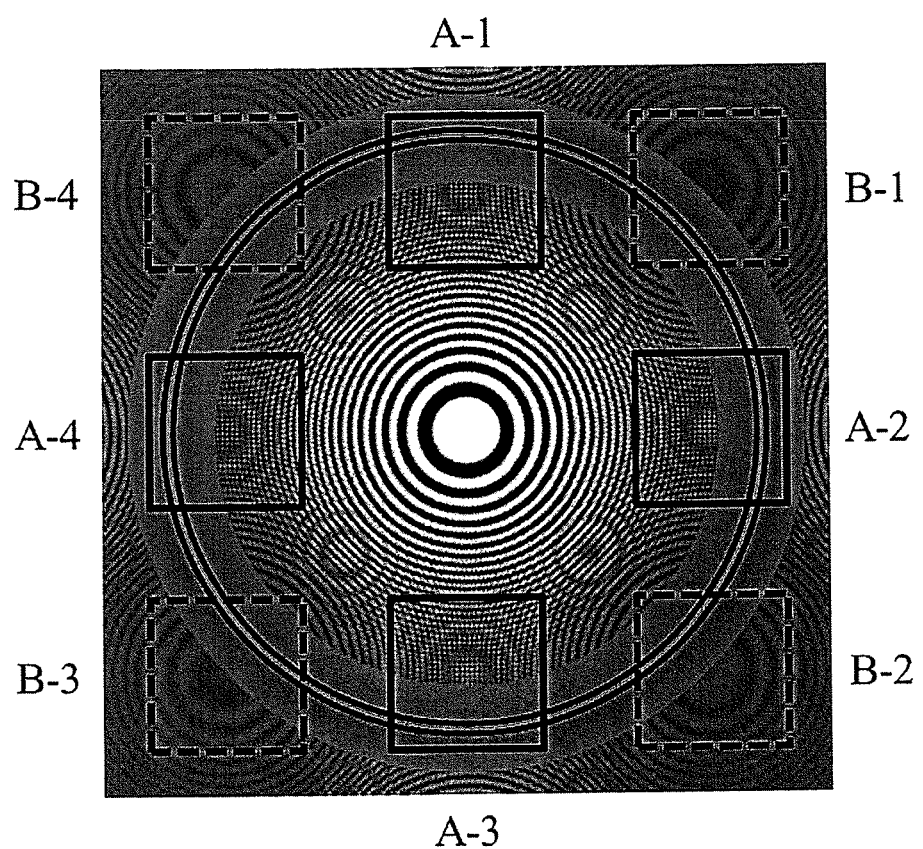
FIG. 9 is an explanatory diagram of an image of a CZP chart that was photographed by the digital camera, of the illustrated embodiment, while driving the image sensor in a circular path, having a diameter of 1.30 times the pixel interval d.

FIG. 9 shows a photographed image in which a CZP chart is imaged by driving the image sensor 22 at a driving diameter D of, e.g., d*1.30, which is greater than d*π/(2*$2^{1/2}$) and smaller than d*π/2. In this photographed image, the portion (circular double-ringed portion) of the "d*1.30/(π/4) wavelength of object-image pattern" is well diffused. This "d*1.30/(π/4) wavelength of object-image pattern" corresponds to a strip area centered along a circular double-ringed portion that passes through portions of areas A-1 through A-4 and areas B-1 through B-4; the diffusion that occurs in this strip area obtains false-color removal with respect to areas A-1 through A-4 and areas B-1 through B-4.

There is a certain amount of freedom in regard to the selection of the drive diameter for the image sensor 22, in other words, the selection of the false-color removal (LPF) effect; e.g., the selection can be carried out by a manual operation of the low-pass filter switches 27, or by an automatic operation carried out by the DSP 40 based on various photographing parameters.

In this embodiment, the drive diameter D of the circular path for driving the image sensor 22 can be selected as desired or selected at stages, via an LPF mode selection operation, within the range of condition (1):

$$d*\pi/(2*2^{1/2}) \leq D \leq d*\pi/2 \quad (1),$$

and more preferably, within the range from "0" (OFF) to a value slightly larger than $d*\pi/2$ (to around $d*2\pi/3$).

Figure 10A:
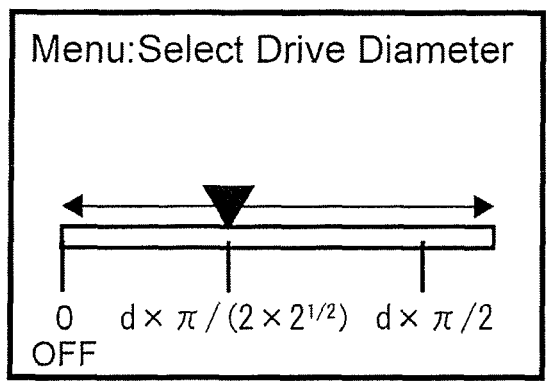
FIG. 10A is a diagram showing a screen example, for selecting an image-sensor drive diameter, in the digital camera of the illustrated embodiment.

FIG. 10A shows the LCD 24 of a first example of the LPF mode section screen. In this first example, the drive diameter D of the circular path for driving the image sensor 22 by a drive diameter selector (processor) 42 is selected from a range of "0" (OFF) to $d*2\pi/3$, which includes "$d*\pi/(2*2^{1/2}) \leq D \leq d*\pi/2$".

The selection operation is carried out by retrieving the above-mentioned screen via operation of the low-pass filter switches 27, etc., and moving a triangular indicator mark in the leftward/rightward direction by operating the low-pass filter switches 27, etc. In this selection operation, driving target values that have a high prevention effect for occurrence of vertical/horizontal and diagonal false color (moire) are shown as selectable indicators, so that it is easier to select the false color (moire) to be reduced in the image, as intended. The drive diameter selector 42 selects the drive diameter that is shown at the indicator mark, and the drive-signal generator 61 drives the image sensor 22 in a circular path at the selected drive diameter D in a plane orthogonal to the optical axis.

In this example, since the photographer can select a desired drive diameter D of the circular path along which the image sensor 22 is driven, the photographer can confirm the false-color removal effect while viewing a photographed image or a live-view image, and can select the drive diameter that obtains the most appropriate false-color removal effect by a switching operation.

Figure 10B:
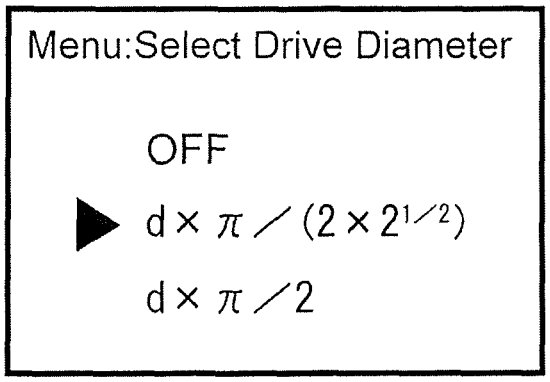
FIG. 10B is a diagram showing another screen example, for selecting an image-sensor drive diameter, in the digital camera of the illustrated embodiment.

In a second example, the drive diameter D of the circular path for driving the image sensor 22 can be selected from, e.g., three varieties: $d*\pi/2$, $d*\pi/(2*2^{1/2})$, and OFF. FIG. 10B shows one example of an LPF mode selection screen that is displayed in the LCD 24. In this LPF mode selection screen, "OFF" refers to when the image sensor 22 is not driven, and hence, a false-color removal effect cannot be obtained. In the selection screen, "$d*\pi/(2*2^{1/2})$" refers to driving at the drive diameter $D=d*\pi/(2*2^{1/2})$ and "$d*\pi/2$" refers to driving at the drive diameter $D=d*\pi/2$.

The selection operation is carried out by retrieving the above-mentioned section screen by operating the low-pass filter switches 27, etc., and moving upwardly/downwardly a triangular indicator mark on the left by operating the low-pass filter switches 27, etc. The drive diameter selector 42 selects the drive diameter D that is designated by the triangular indicator mark, and the drive-signal generator 61 drives the image sensor 22 in a circular path of the selected drive diameter D in a plane orthogonal to the optical axis. The aforementioned $d*1.30$ can be added as a selectable drive diameter D.

In this second example, the photographer can easily select a drive diameter D that has a high false-color removal effect for vertical/horizontal ring formations and a high false-color removal effect for 45-degree ring formations while viewing a photographed image or a live-view image.

In the present invention, the LPF operation can be carried out during photographic bracketing. In such an arrangement, a configuration is possible in which the number of photographs to be taken, the number of drive diameters by which the image sensor 22 is to be driven, the type of LPF operation, and the photographing order are designated at the time of manufacture, or are selected by the user.

In the above-described embodiment, an example is described in which the image sensor 22 is driven in a plane that is orthogonal to the optical axis, with the image sensor 22 acting as a "movable member/shake-correction member"; however, the present invention is not limited thereto. For example, it is possible for a lens element (optical element) constituting at least part of the photographing lens group (photographing optical system) 31 to serve as a "movable member/shake-correction member", in which this lens element (optical element) is driven in a plane that is orthogonal to the optical axis by a voice coil motor (drive mechanism) provided within the photographing lens 30. Alternatively, it is possible for both the image sensor 22 and a lens element (optical element) constituting at least part of the photographing lens group (photographing optical system) 31 to serve as a "movable member/shake-correction member", which is driven in a plane that is orthogonal to the optical axis. In either configuration, image shake can be corrected by displacing the imaging position of an object image on the image sensor 22, while obtaining an optical low-pass filter effect with the object light bundle incident on a plurality of pixels, having different detection colors, of the image sensor 22.

In the above-described embodiment, an example is described in which an image-shake correction operation and an LPF operation are carried by the image sensor 22 by driving the image sensor 22 in a plane that is orthogonal to the optical axis via a single (common) image-shake correction device (drive mechanism) 50; however, one of the image sensor 22 and the lens element (optical element) constituting at least part of the photographing lens group (photographing optical system) 31 can be used to carry out the image-shake correction operation, and the other of the image sensor 22 and the lens element (optical element) constituting at least part of the photographing lens group (photographing optical system) 31 can be used to carry out the LPF operation. In such a case, the drive-signal processor 41 controls the movement of the lens element (optical element) so that an intersection point (object image) between the optical axis Z of the photographing lens group 31 and the pixels 22a (color filters/light-receiving surface) of the image sensor 22 moves in a circular path of the drive diameter D. When the LPF operation is carried out, the image-shake correction operation does not need to be carried out.

Furthermore, the drive system for carrying out the LPF operation can be configured of a piezo driver, etc.

Although in the above-described embodiment an example is given in which the image sensor (movable member/image-shake correction member) 22 is driven, via the image-shake correction device (drive mechanism) 50, in a plane that is orthogonal to the optical axis in order to carry out an image-shake correction operation and an LPF operation, the direction in which the image sensor 22 is to be driven is not limited to such a direction, so long as the direction is different to that of the optical axis of the photographing optical system.

Although in the above-described embodiment an example is given in which the image-shake correction device (drive mechanism) 50 is configured by the magnets M1, M2 and M3 and the yokes Y1, Y2 and Y3 being mounted onto the mount support plate 51, and the drive coils C1, C2 and C3 being mounted onto the mount support plate 51, the positional relationship thereof can be reversed by mounting the magnets and the yokes onto the movable stage and mounting the drive coils onto the mount support plate.

Although in the above-described embodiment an example is given in which the body 20 and the photographing lens 30 are detachably attached to each other (lens interchangeable), a configuration is possible in which the body 20 and the photographing lens 30 are not detachably attached (non lens-interchangeable).

Although the digital camera 10 has been described herein as a photographing apparatus to which the present invention is applied, the present invention can also be applied to any device which includes a lens system, an image sensor and an image processor, for example: a smart device that is provided with an in-built digital camera (photographing apparatus) such as a smart phone or a tablet computer, or a video camera that is capable of taking a still image (picture).

INDUSTRIAL APPLICABILITY

It is desirable for the photographing apparatus and the photographing control method according to the present invention to be used in a photographing apparatus such as a digital camera, etc.

REFERENCE SIGNS LIST

10 Digital camera (Photographing apparatus)
20 Body
21 Shutter
22 Image sensor (Shake-correction member)
22a Pixels
R G B Color filters
23 Diaphragm/shutter drive circuit
24 LCD
25 Image memory
26 Photographing-operation switches
27 Low-pass filter switches
28 Gyro sensor
30 Photographing lens (Photographing optical system)
31 Photographing lens group (Photographing optical system/shake-correction member)
32 Diaphragm
33 Communication memory
40 DSP
41 Drive-signal processor
42 Drive diameter selector (Processor)
50 Image-shake correction device (Image-shake correction member drive mechanism)
51 Mount support plate
52 Movable stage
M1 M2 M3 Magnets
Y1 Y2 Y3 Yokes
C1 C2 C3 Drive coils
H1 H2 H3 Hall sensors
60 Image sensor drive circuit
61 Drive-signal generator

The invention claimed is:

1. A photographing apparatus comprising:
an image sensor, which converts an object image that is formed by a photographing optical system into electrical pixel signals, and includes a plurality of color filters;
a movable-member driver configured to move a movable member in a direction that is different from an optical axis of said photographing optical system, wherein said movable member includes at least one of an optical element, constituting at least one part of said photographing optical system, and said image sensor;
a drive controller configured to control a driving of said movable member to move in a predetermined circular path via said movable-member driver; and
a processor configured to select a drive diameter D of said predetermined circular path by which said drive controller controls the driving of said movable member within a range of the following condition (1):

$$d*\pi/(2*2^{1/2}) \leq D \leq d*\pi/2 \qquad (1),$$

wherein d designates a pixel interval of said image sensor.

2. The photographing apparatus according to claim 1, wherein said processor selects a value of "$d*\pi/(2*2^{1/2})$" or "$d*\pi/2$" as said drive diameter D.

3. The photographing apparatus according to claim 1, wherein said processor selects a value of any one of "$d*\pi/(2*2^{1/2})$", $d*1.3$, and "$d*\pi/2$" as said drive diameter D.

4. The photographing apparatus according to claim 1, wherein said movable member comprises said image sensor, wherein said movable-member driver is provided with a mount support plate; a movable stage onto which said image sensor is mounted, said movable stage being slidable relative to said mount support plate; a magnet mounted on one of said mount support plate and said movable stage; and a drive coil mounted on the other of said mount support plate and said movable stage, and
wherein said drive controller is configured to control a driving of said movable stage to move in the predetermined circular path relative to said mount support plate by supplying an alternating drive signal to said drive coil.

5. The photographing apparatus according to claim 1, wherein said movable-member driver is configured to move said movable member in a direction different to that of the optical axis of said photographing optical system to carry out an optical low-pass filter operation in which a light bundle emanating from said object image is incident on a plurality of said color filters, having different detection colors, of said image sensor,
wherein said drive controller is configured to control, via said image-shake correction device, a driving of said movable member to move in said predetermined circular path at the drive diameter D that is selected by said processor so that said object-image light bundle relatively moves on the image sensor in said predetermined circular path at the drive diameter D.

6. A photographing control method, which includes an image sensor, which converts an object image that is formed by a photographing optical system into electrical pixel signals, and includes a plurality of color filters; and a movable-member driver configured to move a movable member in a direction that is different from an optical axis of said photographing optical system, wherein said movable member includes at least one of an optical element, constituting at least one part of said photographing optical system, and said image sensor; said photographing control method comprising:
controlling a driving of said movable member to move in a circular path of a predetermined drive diameter via said movable-member driver; and
selecting a drive diameter D of said circular path by which the driving of said movable member is controlled within a range of the following condition (1):

$$d*\pi/(2*2^{1/2}) \leq D \leq d*\pi/2 \qquad (1),$$

wherein d designates a pixel interval of said image sensor.

* * * * *